(12) United States Patent
Woo et al.

(10) Patent No.: US 7,258,951 B2
(45) Date of Patent: Aug. 21, 2007

(54) LITHIUM SECONDARY BATTERY

(75) Inventors: Il-Ki Woo, Cheonan-si (KR);
Sang-Won Lee, Cheonan-si (KR);
Jung-Joon Park, Cheonan-si (KR);
Young-Bae Roh, Cheonan-si (KR);
Kwang-Sik Kim, Cheonan-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/494,211

(22) Filed: Jan. 25, 2000

(65) Prior Publication Data

US 2002/0192554 A1  Dec. 19, 2002

(30) Foreign Application Priority Data

Jan. 25, 1999 (KR) ................................. 1999-2257
Nov. 17, 1999 (KR) ............................... 1999-51148

(51) Int. Cl.
*H01M 4/66* (2006.01)
*H01M 6/14* (2006.01)

(52) U.S. Cl. ...................................... 429/245; 29/623.1
(58) Field of Classification Search ................. 429/209, 429/231.8, 231.1, 233, 245, 231.3; 29/623.1
See application file for complete search history.

(56) References Cited

U.S. PATENT DOCUMENTS 5,368,958 A * 11/1994 Hirai et al. ................. 429/211
5,464,706 A * 11/1995 Dasgupta et al.
5,589,299 A * 12/1996 Yamada et al.
5,601,950 A * 2/1997 Yamahira et al.
5,686,203 A * 11/1997 Idota et al.
5,702,845 A * 12/1997 Kawakami et al. ......... 429/224
6,235,427 B1 * 5/2001 Idota et al. ............... 429/218.1

FOREIGN PATENT DOCUMENTS

JP    06333569 A  * 12/1994
JP    11086871 A  *  3/1999
JP    11339811 A  * 12/1999
WO    WO97/32347  *  9/1997

OTHER PUBLICATIONS

Hawley's Condensed Chemical Dictionary, pp. 1092-1093. 1987, no month.*

* cited by examiner

*Primary Examiner*—Tracy Dove
(74) *Attorney, Agent, or Firm*—Blakely Sokoloff Taylor & Zafman

(57) ABSTRACT

A lithium secondary battery exhibiting good mechanical properties and using a thin negative current collector is provided. The lithium secondary battery includes a positive electrode formed by coating lithium metal oxides on a positive current collector and a negative electrode formed by coating carbonaceous materials or $SnO_2$ on a negative current collector. The negative current collector is made of a Cu-based alloy foil with a thickness of 20 μm or less and the Cu-based alloy foil includes at least one material selected from the group consisting of nickel, titanium, magnesium, tin, zinc, boron, chromium, manganese, silicone, cobalt, iron, vanadium, aluminum, zirconium, niobium, phosphorous, bismuth, lead, silver and misch metal. The lithium secondary battery further includes a separator interposed between the positive and negative electrodes and an electrolyte into which the positive and negative electrodes and the separator are immersed.

14 Claims, No Drawings

LITHIUM SECONDARY BATTERY

CROSS REFERENCE TO RELATED APPLICATION

This application is based on applications Nos. 99-2257 and 99-51148 respectively filed in the Korean Industrial Property Office on Jan. 25, 1999 and Nov. 17, 1999, the contents of which are incorporated hereinto by reference.

BACKGROUND OF THE INVENTION (a) Field of the Invention

The present invention relates to a lithium secondary battery and, more particularly, to a lithium secondary battery which exhibits particular mechanical properties using a thin negative current collector.

(b) Description of the Related Art

Conventionally, a copper foil with at least 99.8% purity has been used as a negative current collector for a lithium secondary battery. During charge and discharge, a negative electrode is expanded (an expansion of about 10%) and the expansion results in a tensile stress in a current collector made of the copper foil. However, as the durable tensile strength of copper foil is low, such a foil is easily torn.

The weak tensile strength of copper foil makes to difficult to reduce the thickness of the copper foil, which prohibits an increases in an amount of a negative active material in a battery. Accordingly, it is impossible to produce a battery having high capacity using copper foil.

SUMMARY OF THE INVENTION

It is an object of the present invention to provide a lithium secondary battery exhibiting good tensile strength.

It is another object to provide a lithium secondary battery using a thin negative current collector.

These and other objects may be achieved by a lithium secondary battery including a positive electrode formed by coating lithium metal oxides on a positive current collector, and a negative electrode formed by coating carbonaceous materials or $SnO_2$ on a negative current collector. The negative current collector is made of a Cu-based alloy foil with a thickness of 20 μm or less and the Cu-based alloy foil includes at least one material selected from the group consisting of nickel, titanium, magnesium, tin, zinc, boron, chromium, manganese, silicon, cobalt, iron, vanadium, aluminum, zirconium, niobium, phosphorous, bismuth, lead, silver, and misch metal. The lithium secondary battery further includes a separator interposed between the positive and negative electrodes and an electrolyte into which the positive and negative electrodes and the separator are immersed.

DETAILED DESCRIPTION OF THE INVENTION

The present invention provides a lithium secondary battery exhibiting high capacity. The lithium secondary battery is manufactured by using a Cu-based alloy foil having both a good tensile strength and a thin thickness.

The Cu-based alloy foil includes at least one material selected from nickel, titanium, magnesium, tin, zinc, boron, chromium, manganese, silicon, cobalt, iron, vanadium, aluminum, zirconium, niobium, phosphorous bismuth, lead, silver and misch metal. The amount of nickel is 0.8 to 4 wt % of the copper, that of titanium is 0.2 to 4 wt % of the copper, that of magnesium is 0.05 to 0.6 wt % of the copper, and that of tin is 0.1 to 2.0 wt % of the copper. The amount of zinc is 0.0005 to 0.5 wt % of the copper, that of boron is 0.0005 to 5.0 wt % of the copper, that of boron is 0.0005 to 5.0 wt % of the copper, that of chromium is 0.0005 to 0.5 wt % of the copper, and that of manganese is 0.1 to 1.0 wt % of the copper. The amount of silicon is 0.1 to 0.5 wt % of the copper, that of iron or cobalt is 0.01 to 2.0 wt % of the copper, that of vanadium is 0.0005 to 0.5 wt % of the copper, and that of aluminum is 0.005 to 0.5 wt % of the copper. The amount of zirconium is 0.0005 to 0.5 wt % of the copper, that of niobium is 0.0005 to 0.5 wt % of the copper, that of phosphorous is 0.02 to 0.16 wt % of the copper, that of bismuth is 0.0005 to 0.5 wt % of the copper, that of lead is 0.0005 to 0.5 wt % of the copper, and that of silver is 0.0005 to 0.5 wt % of the copper. If the materials are out of this range, it is difficult to obtain a foil having the desirable tensile strength.

The Cu-based alloy foil is generally produced by an electro-plating process or a cold-rolling process.

In the battery of the present invention, the positive electrode may be produced by dissolving lithium metal oxides such as $LiCoO_2$, $LiNiO_2$, $LiMnO_2$, $LiMn_2O_4$ and a polyvinylidene fluoride binder in N-methyl pyrrolidone to make a slurry, coating the slurry on a positive collector made of aluminum foil, and drying the coated collector.

The negative electrode may be produced by dissolving a negative active material which can reversably intercalate/deintercalate lithium ion (i.e., carbonaceous materials such as crystalline carbon or amorphous carbon, or $SnO_2$) and a polyvinylidene binder in N-methyl pyrrolidone to make a slurry. The slurry is coated on a negative collector of the present invention and then dried. The negative collector preferably has a thickness of 20 μm or less and the Cu-based alloy foil with about 15 μm of thickness can be used for the collector without the deterioration of mechanical properties, such as its tensile strength.

The separator may be a porous film made of polyethylene or to polypropylene.

The electrolyte may be a 1M solution prepared by dissolving $LiPF_6$, $LiAsF_6$, $LiCF_3SO_3$, $LiN(CF_3SO_2)_3$, $LiBF_6$, or $LiClO_4$ in an organic solvent. The organic solvent may be of cyclic carbonates such as propylene carbonate or ethylene carbonate, linear carbonates such as dimthyl carbonate, or diethyl carbonate, or a mixture thereof.

The following examples further illustrate the present invention.

EXAMPLES 1 TO 4 AND COMPARATIVE EXAMPLES 1 TO 2

Foil types for negative current collectors were manufactured according to the compositions shown in Table 1. The electrolytic copper foil was used in Comparative example 1 and the rolled copper foil was used in Comparative example 2. The tensile strengths thereof were measured and the results are present in Table 1. In Table 1, "Com." refers to "comparative example".

TABLE 1

| | Composition | Tensile strength [N/mm$^2$] |
|---|---|---|
| Example 1 | Ni: 1.8 wt %, Ti: 1.1 wt %, Cu: balance | 560 |
| Example 2 | Ni: 2.0 wt %, Ti: 0.9 wt %, Mg: 0.13 wt %, | 620 |

TABLE 1-continued

|  | Composition | Tensile strength [N/mm$^2$] |
|---|---|---|
| Example 3 | Cu: balance<br>Ni: 2.0 wt %, Ti: 1.1 wt %, Mg: 0.29 wt %,<br>Mn: 0.52 wt %, Cu: balance | 620 |
| Example 4 | Ni: 1.5 wt %, Ti: 0.9 wt %, Mg: 0.26 wt %,<br>Zn: 0.20 wt %, Cu: balance | 630 |
| Comp. 1 | Cu: at least 99.9 wt % | 420 |
| Comp. 2 | Cu: at least 99.9 wt % | 340 |

As shown in Table 1, the collectors of Examples 1 to 4 have superior tensile strength to those of Comparative Examples 1 to 2. The collector of Example 4 having 1.5 wt % of nickel, 0.9 wt % of titanium, 0.26 wt % of magnesium, and 0.20 wt % of zinc has the highest tensile strength.

As described, the present invention provides a negative current collector exhibiting improved mechanical strength and thermal conductivity by adding materials such as nickel or titanium to copper. The negative current collector of the present invention exhibits good tensile strength such that a wide collector can be produced to improve workability, and the thickness of current collector can be reduced to increase the capacity of the battery.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for making a lithium secondary battery comprising:
   forming a positive electrode by coating a lithium metal oxide on a positive current collector;
   forming a negative electrode by coating carbonaceous materials or SnO$_2$ on a negative current collector, the negative current collector is made of a Cu-based alloy with a thickness of 20 μm or less and the Cu-based alloy comprises at least four materials selected from the group consisting of boron, cobalt, nickel, titanium, magnesium, tin, zinc, chromium, manganese, iron, vanadium, aluminum, zirconium, niobium, and bismuth, wherein at least three of the four materials are nickel, titanium and magnesium and the Cu-based alloy further comprises a copper-based material selected from the group consisting of copper, copper/nickel, copper/titanium, and copper/nickel/titanium, wherein the Cu-based alloy is produced by a plating process into a foil shape;
   interposing a separator between the positive and negative electrodes; and
   injecting an electrolyte to immerse the positive and negative electrodes and the separator.

2. A lithium secondary battery comprising:
   a positive electrode formed by coating a lithium metal oxide on a positive current collector;
   a negative electrode formed by coating at least one of carbonaceous materials and SnO$_2$ on a negative current collector where the negative current collector is made of a copper-based alloy with a thickness of 20 μm or less and the copper-based alloy comprises at least three materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, silicon in an amount of 0.1 to 0.5 wt % of copper, iron in an amount of 0.01 to 2.0 wt %, vanadium in an amount of 0.0005 to 0.5 wt % of copper, aluminum in an amount of 0.005 to 0.5 wt % of copper, zirconium in an amount of 0.0005 to 0.5 wt % of copper, niobium in an amount of 0.0005 to 0.5 wt % of copper, phosphorous in an amount of 0.02 to 0.16 wt % of copper and bismuth in an amount of 0.0005 to 0.5 wt % of copper, wherein the copper-based alloy is produced by a plating process into a foil shape;
   a separator interposed between the positive and negative electrodes; and
   an electrolyte into which the positive and negative electrodes and the separator are immersed, wherein the at least three materials comprise nickel, titanium, and magnesium.

3. A lithium secondary battery comprising:
   a positive electrode formed by coating a lithium metal oxide on a positive current collector;
   a negative electrode formed by coating at least one of carbonaceous materials and SnO$_2$ on a negative current collector where the negative current collector is made of a copper-based alloy with a thickness of 20 μm or less and the copper-based alloy comprises at least three materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, silicon in an amount of 0.1 to 0.5 wt % of copper, iron in an amount of 0.01 to 2.0 wt %, vanadium in an amount of 0.0005 to 0.5 wt % of copper, aluminum in an amount of 0.005 to 0.5 wt % of copper, zirconium in an amount of 0.0005 to 0.5 wt % of copper, niobium in an amount of 0.0005 to 0.5 wt % of copper, phosphorous in an amount of 0.02 to 0.16 wt % of copper and bismuth in an amount of 0.0005 to 0.5 wt % of copper, wherein the copper-based alloy is produced by a plating process into a foil shape;
   a separator interposed between the positive and negative electrodes; and
   an electrolyte into which the positive and negative electrodes and the separator are immersed, wherein the at least three materials comprise at least four materials and the at least four materials comprise nickel, titanium, magnesium, and manganese.

4. A lithium secondary battery comprising:
   a positive electrode formed by coating a lithium metal oxide on a positive current collector;
   a negative electrode formed by coating at least one of carbonaceous materials and SnO$_2$ on a negative current collector where the negative current collector is made of a copper-based alloy with a thickness of 20 μm or less and the copper-based alloy comprises at least three materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, silicon in an amount of 0.1 to 0.5 wt % of copper, iron in an amount of 0.01 to 2.0 wt %, vanadium in an amount of 0.0005 to 0.5 wt % of copper, aluminum in an amount of 0.005 to 0.5 wt % of copper, zirconium in an amount of 0.0005 to 0.5 wt % of copper, niobium in an amount of 0.0005 to 0.5 wt % of copper, phosphorous in an amount of 0.02 to 0.16 wt % of copper and bismuth in an amount of 0.0005 to 0.5 wt % of copper, wherein the copper-based alloy is produced by a plating process into a foil shape;

a separator interposed between the positive and negative electrodes; and an electrolyte into which the positive and negative electrodes and the separator are immersed, wherein the at least three materials comprise at least four materials and the at least four materials comprise nickel, titanium, magnesium, and zinc.

5. A lithium secondary battery comprising:

a positive electrode formed by coating a lithium metal oxide on a positive current collecter;

a negative electrode formed by coating at least one of carbonaceous materials and SnO$_2$ on a negative current collector where the negative current collector is made of a copper-based alloy with a thickness of 20 μm or less and the copper-based alloy comprises at least three materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, silicon in an amount of 0.1 to 0.5 wt % of copper, iron in an amount of 0.01 to 2.0 wt %, vanadium in an amount of 0.0005 to 0.5 wt % of copper, aluminum in an amount of 0.005 to 0.5 wt % of copper, zirconium in an amount of 0.0005 to 0.5 wt % of copper, niobium in an amount of 0.0005 to 0.5 wt % of copper, phosphorous in an amount of 0.02 to 0.16 wt % of copper and bismuth in an amount of 0.0005 to 0.5 wt % of copper, wherein the copper-based alloy is produced by a plating process into a foil shape;

a separator interposed between the positive and negative electrodes; and an electrolyte into which the positive and negative electrodes and the separator are immersed, wherein the at least three materials comprise at least four materials and the at least four materials comprise nickel, titanium, magnesium, and zinc, wherein the amount of nickel is 0.8 to 4 wt % of the copper, the amount of titanium is 0.2 to 4 wt % of the copper, the amount of magnesium is 0.05 to 0.6 wt % of the copper, and the amount of zinc is 0.0005 to 0.5 wt % of the copper.

6. A method for making a lithium secondary battery comprising:

forming a positive electrode by coating a lithium metal oxide on a positive current collector;

forming a negative electrode by coating at least one of carbonaceous materials and SnO$_2$ on a negative current collector where the negative current collector is made of a Cu-based alloy with a thickness of 20 μm or less, and the Cu-based alloy including at least three materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, silicon in an amount of 0.1 to 0.5 wt % of copper, iron in an amount of 0.01 to 2.0 wt %, vanadium in an amount of 0.0005 to 0.5 wt % of copper, aluminum in an amount of 0.005 to 0.5 wt % of copper, zirconium in an amount of 0.0005 to 0.5 wt % of copper, niobium in an amount of 0.0005 to 0.5 wt % of copper, phosphorous in an amount of 0.02 to 0.16 wt % of copper and bismuth in an amount of 0.0005 to 0.5 wt % of copper, wherein the copper-based alloy is produced by a plating process into a foil shape;

interposing a separator between the positive and negative electrodes; and injecting an electrolyte to immerse the positive and negative electrodes and the separator, wherein the at least three materials comprise nickel, titanium, and magnesium.

7. A method for making a lithium secondary battery comprising:

forming a positive electrode by coating a lithium metal oxide on a positive current collector;

forming a negative electrode by coating at least one of carbonaceous materials and SnO$_2$ on a negative current collector where the negative current collector is made of a Cu-based alloy with a thickness of 20 μm or less, and the Cu-based alloy including at least three materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, silicon in an amount of 0.1 to 0.5 wt % of copper, iron in an amount of 0.01 to 2.0 wt %, vanadium in an amount of 0.0005 to 0.5 wt % of copper, aluminum in an amount of 0.005 to 0.5 wt % of copper, zirconium in an amount of 0.0005 to 0.5 wt % of copper, niobium in an amount of 0.0005 to 0.5 wt % of copper, phosphorous in an amount of 0.02 to 0.16 wt % of copperand bismuth in an amount of 0.0005 to 0.5 wt % of copper, wherein the copper-based alloy is produced by a plating process into a foil shape;

interposing a separator between the positive and negative electrodes; and injecting an electrolyte to immerse the positive and negative electrodes and the separator, wherein the at least three materials comprise at least four materials and the at least four materials comprise nickel, titanium, magnesium, and manganese.

8. A method for making a lithium secondary battery comprising:

forming a positive electrode by coating a lithium metal oxide on a positive current collector;

forming a negative electrode by coating at least one of carbonaceous materials and $SnO_2$ on a negative current collector where the negative current collector is made of a Cu-based alloy with a thickness of 20 μm or less, and the Cu-based alloy including at least three materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, silicon in an amount of 0.1 to 0.5 wt % of copper, iron in an amount of 0.01 to 2.0 wt %, vanadium in an amount of 0.0005 to 0.5 wt % of copper, aluminum in an amount of 0.005 to 0.5 wt % of copper, zirconium in an amount of 0.0005 to 0.5 wt % of copper, niobium in an amount of 0.0005 to 0.5 wt % of copper, phosphorous in an amount of 0.02 to 0.16 wt % of copperand bismuth in an amount of 0.0005 to 0.5 wt % of copper, wherein the copper-based alloy is produced by a plating process into a foil shape;

interposing a separator between the positive and negative electrodes; and injecting an electrolyte to immerse the positive and negative electrodes and the separator, wherein the at least three materials comprise at least four materials and the at least four materials comprise nickel, titanium, magnesium, and zinc.

9. A lithium secondary battery comprising:

a positive electrode formed by coating a lithium metal oxide on a positive current collector;

a negative electrode formed by coating at least one of carbonaceous materials and $SnO_2$ on a negative current collector, where the negative current collector is made of a copper-based alloy foil with a thickness of 20 μm or less, and the copper-based alloy foil includes at least four materials selected from the group consisting of boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, manganese in an amount of 0.1 to 1.0 wt % of copper, and zinc in an amount of 0.0005 to 0.5 wt %, wherein at least three of the four materials are nickel, titanium and magnesium;

a separator interposed between the positive and negative electrodes; and an electrolyte into which the positive and negative electrodes and the separator are immersed.

10. The lithium secondary battery of one of claims 2, 3, 4 or 5, wherein the copper-based alloy foil is produced by an electro-plating process.

11. The method of one of claims 6, 7 or 8, wherein the copper-based alloy foil is produced by an electro-plating process.

12. The lithium secondary battery of claim 9, wherein the copper-based alloy foil is produced by an electro-plating process.

13. A lithium secondary battery comprising:

a positive electrode formed by coating lithium metal oxides on a positive current controller;

a negative electrode formed by coating carbonaceous materials or $SnO_2$ on a negative current collector the negative current collector being formed of a copper-based alloy foil with a thickness of 20 μm or less and the copper-based alloy including magnesium in an amount of 0.05 to 0.6 wt % of copper, and further comprises a copper-based material comprised of copper/nickel/titanium, wherein the copper-based alloy is produced by a plating process into a foil shape;

a separator interposed between the positive and negative electrodes; and an electrolyte into which the positive and negative electrodes and the separator are immersed.

14. The method of claim 1, wherein the copper-based alloy includes boron in an amount of 0.0005 to 5.0 wt % of copper, cobalt in an amount of 0.01 to 2.0 wt % of copper, nickel in an amount of 0.8 to 4 wt % of copper, titanium in an amount of 0.2 to 4 wt % of copper, magnesium in an amount of 0.05 to 0.6 wt % of copper, tin in an amount of 0.1 to 2.0 wt % of copper, zinc in an amount of 0.0005 to 0.5 wt % of copper, chromium in an amount of 0.0005 to 0.5 wt % of copper, manganese in an amount of 0.1 to 1.0 wt % of copper, iron in an amount of 0.01 to 2.0 wt %, vanadium in an amount of 0.0005 to 0.5 wt % of copper, aluminum in an amount of 0.005 to 0.5 Wt % of copper, zirconium in an amount of 0.0005 to 0.5 wt % of copper, niobium in an amount of 0.0005 to 0.5 wt % of copper, and bismuth in an amount of 0.0005 to 0.5 wt % of copper.

* * * * *